(12) United States Patent
Tanabe

(10) Patent No.: US 6,754,607 B2
(45) Date of Patent: Jun. 22, 2004

(54) FAILURE DIAGNOSIS METHOD FOR CONTROL APPARATUS

(75) Inventor: Itaru Tanabe, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/095,432

(22) Filed: Mar. 13, 2002

(65) Prior Publication Data

US 2003/0097234 A1 May 22, 2003

(30) Foreign Application Priority Data

Nov. 16, 2001 (JP) ........................................ 2001-350915

(51) Int. Cl.⁷ ................................................ G01K 7/00
(52) U.S. Cl. ..................................................... 702/130
(58) Field of Search ............................... 702/130, 182, 702/183, 185, 99, 136; 700/299, 300; 374/100, 109

(56) References Cited

U.S. PATENT DOCUMENTS 6,204,768 B1 * 3/2001 Kosugi et al. .............. 340/577
6,438,502 B1 * 8/2002 Awtrey et al. .............. 702/130
6,581,022 B2 * 6/2003 Murakami ................... 702/136

FOREIGN PATENT DOCUMENTS

JP 2000-267522 9/2000

* cited by examiner

Primary Examiner—Michael Nghiem
(74) Attorney, Agent, or Firm—Crowell & Moring LLP

(57) ABSTRACT

A control apparatus can monitor the internal temperature and ambient temperature of the control apparatus and save the appropriate information in the memory media of the control apparatus if the difference between the internal and external temperature exceeds the required temperature range. Even if the temperature gradient is too steep, the required information can be saved in the memory media of the control apparatus.

20 Claims, 6 Drawing Sheets $T_{PWB}$ : INTERNAL TEMPERATURE
$T_{OIL}$ : EXTERNAL TEMPERATURE
$T_{BR}$ : TEMPERATURE AT WHICH AN INTERNAL ELEMENT FAILURE MAY OCCUR
$T_{NG}$ : FAILURE DETECTION TEMPERATURE

FAILURE DIAGNOSIS METHOD FOR CONTROL APPARATUS

BACKGROUND OF THE INVENTION

The present invention relates to a control apparatus and its failure analysis, particularly to the technology for analyzing control apparatus failures by recording whether the failure in the control apparatus is caused by increases in temperature due to an internal element failure in the control apparatus itself or by increases in temperature due to a system failure.

The configuration in prior art was such that as described in, for example, Japanese Application Patent Laid-open Publication No. 2000-267522, after the temperature of the control apparatus has been monitored using temperature sensors, when the detected temperature is higher or lower than a predetermined temperature that has been set as the judgment criterion, that state is detected as trouble and the control apparatus itself stores the corresponding trouble information or issues a warning to the user by use of a display unit.

The above-described prior art has the problem that for example, if the gradient of the temperature increases existing during trouble is too steep, the memory media themselves become damaged during storage of the corresponding trouble information into the control apparatus itself and consequently, the trouble information cannot be saved.

The prior art also poses the problem that when a failure in the control apparatus is analyzed, it cannot be judged whether the failure was caused by an abnormal ambient temperature or by trouble with the internal elements of the control apparatus itself.

SUMMARY OF THE INVENTION

The object of the present invention is to supply a control apparatus which, even if the temperature gradient is too steep, can save the required information in the memory media of the control apparatus or analyze whether the failure was caused by an abnormal ambient temperature or by trouble with the internal elements of the control apparatus itself.

In order to attain the above object, the internal temperature of the control apparatus and the ambient temperature thereof are monitored and if the difference between these temperatures oversteps the required temperature range, trouble information will be stored into the memory media of the control apparatus. Also, the required relationship on the temperature difference between the internal temperature of the control apparatus and the ambient temperature thereof is considered to judge whether the failure was caused by an abnormal ambient temperature or by trouble with the internal elements of the control apparatus itself.

DESCRIPTION OF THE PREFERRED EMBODIMENTS

Figure 1:
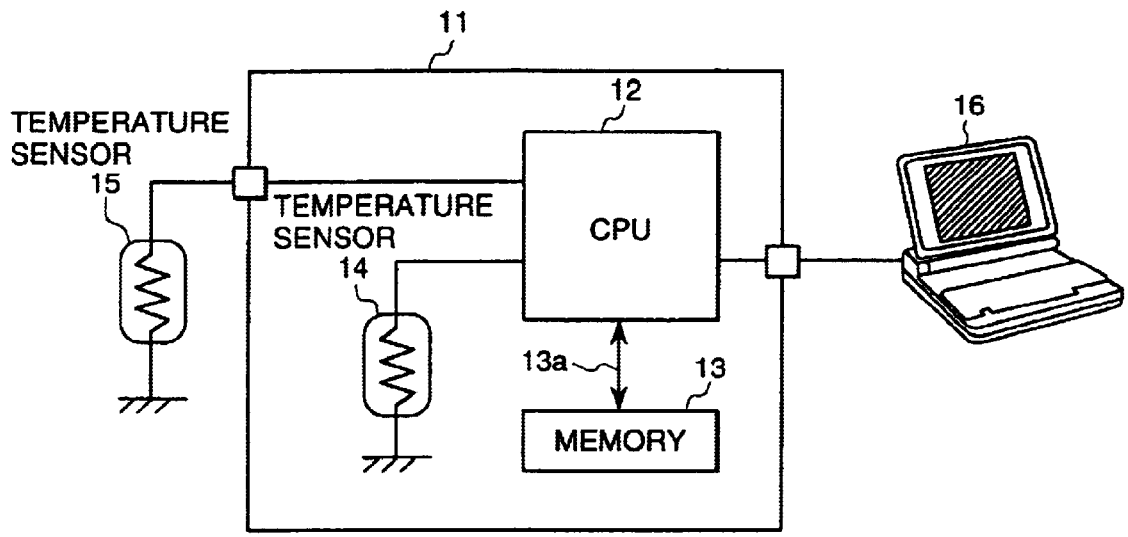
FIG. 1 is a block diagram showing an embodiment of the control apparatus.

The preferred embodiments of the present invention are described below using FIG. 1.

Control apparatus 11 comprises an internal temperature sensor 14 for detecting the internal temperature of the control apparatus, an external temperature sensor 15 for detecting the external temperature of the control apparatus, a CPU 12 capable of acquiring temperature information from the above-mentioned temperature sensors, an internal memory medium (memory 13) connected to the above-mentioned CPU 12 in order to store the information that has undergone required processing, and a monitoring unit 16 connected to CPU 12 and capable of reading out internal information from the above-mentioned internal memory medium 13.

An embodiment of control apparatus 11 is described below using FIGS. 1, 2, 3, 4, 5, and 9.

First, the detection of control apparatus internal failures, based on the prior art, is described.

Figure 2:
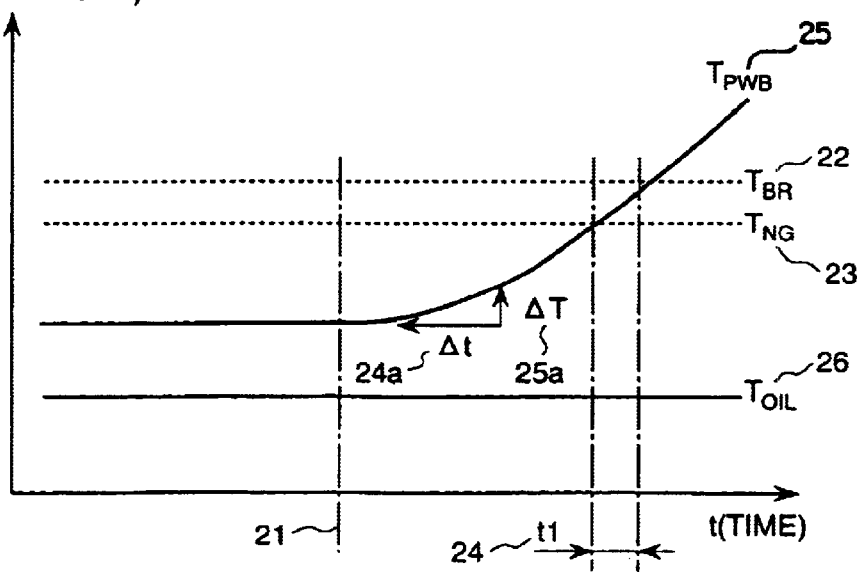
FIG. 2 is a graph showing an embodiment of the control apparatus.

FIG. 2 is a graph showing the relationship between the control apparatus internal temperature and ambient temperature, established by the occurrence of a control apparatus internal element failure.

The factors in the figure denote the control apparatus internal temperature $T_{PWB}$ 25 that was detected by the internal temperature sensor 14 of control apparatus 11, the control apparatus external temperature $T_{OIL}$ 26 that was detected by the external temperature sensor 15 of the control apparatus, the time 21 at which an internal element failure in the control apparatus is likely to occur, the temperature $T_{BR}$ 22 at which an internal element failure in the control apparatus is likely to occur, a failure detection temperature $T_{NG}$ 23, a unit time ""$\Delta t$"" (24a), a temperature rise ""$\Delta T$"" (25a), the time ""t1"" (24) from the arrival of the above-mentioned control apparatus internal temperature $T_{PWB}$ 25 at the above-mentioned failure detection temperature $T_{NG}$ 23 to the arrival of control apparatus internal temperature $T_{PWB}$ 25 at $T_{BR}$ 22, the temperature at which an internal element failure in the control apparatus is likely to occur.

Next, the flow of processes up to failure detection is described.

First, during normal operation of control apparatus 11, while the internal temperature $T_{PWB}$ 25 of the control apparatus and the external temperature $T_{OIL}$ 26 of the control apparatus are lower than failure detection temperature $T_{NG}$ 23 and temperature $T_{BR}$ 22 at which an internal element failure in the control apparatus is likely to occur, and while the amount of heat occurring in the control apparatus is constant, internal temperature $T_{PWB}$ 25 and external temperature $T_{OIL}$ 26 always change with their difference remaining fixed (see the left of the dotted line shown as 21 in FIG. 2). Next, if a specific element inside"

control apparatus 11 fails to operate in, for example, short-circuit mode, the internal temperature $T_{PWB}$ 25 of the control apparatus will begin increasing at 21, the time when an internal element failure in the control apparatus is likely to occur. If internal temperature $T_{PWB}$ 25 continues increasing, it will reach the failure detection temperature $T_{NG}$ 23 of control apparatus 11. At this time, CPU 12 will judge control apparatus 11 to be abnormal, and the CPU will start saving predetermined control data in internal memory medium 13. If internal temperature $T_{PWB}$ 25 further continues increasing, it will reach temperature $T_{BR}$ 22 at which the control apparatus is likely to encounter some other internal element failure, with the result that some other internal element of the control apparatus will fail.

The saving of the above-mentioned control data in internal memory medium 13 must be executed during the time "t1" (24) from the arrival of control apparatus internal temperature $T_{PWB}$ 25 at failure detection temperature $T_{NG}$ 23 to the arrival of control apparatus internal temperature $T_{PWB}$ 25 at temperature $T_{BR}$ 22, the temperature at which the control apparatus is likely to encounter some other internal element failure.

For example, if the internal temperature of the control apparatus increases too abruptly, control apparatus internal temperature $T_{PWB}$ 25 will increase in temperature rise "ΔT" (25a) per unit time "Δt" (24a). That is to say, the time "t1" (24) from the arrival of control apparatus internal temperature $T_{PWB}$ 25 at failure detection temperature $T_{NG}$ 23 to the arrival of control apparatus internal temperature $T_{PWB}$ 25 at temperature $T_{BR}$ 22 (the temperature at which the control apparatus is likely to encounter some other internal element failure), will be reduced since the slope of control apparatus internal temperature $T_{PWB}$ will become steep. Consequently, it may not be possible to obtain a sufficient time for the control data to be saved in internal memory medium 13.

There also occurs the problem that even after control apparatus internal temperature $T_{PWB}$ 25 has increased at a steep gradient, to extend the time "t1" (24) from the arrival of control apparatus internal temperature $T_{PWB}$ 25 at failure detection temperature $T_{NG}$ 23 to the arrival of control apparatus internal temperature $T_{PWB}$ 25 at temperature $T_{BR}$ 22 (the temperature at which the control apparatus is likely to encounter some other internal element failure), failure detection temperature $T_{NG}$ 23 must be set to a smaller value and consequently, it becomes absolutely necessary to make narrower the ambient temperature range in which control apparatus 11 can operate properly.

In addition, the prior art creates the problem that because of the absence of the concept that the judgment of whether the failure in control apparatus 11 is due to an increase in the internal temperature of the control apparatus or due to an increase in its external temperature is not based on such distinction, the above judgment cannot be performed even by conducting failure analyses based on the control data that was stored into the internal memory medium 13 of the control apparatus.

Next, the detection of control apparatus internal failures, based on the present invention, is described.

Figure 3:
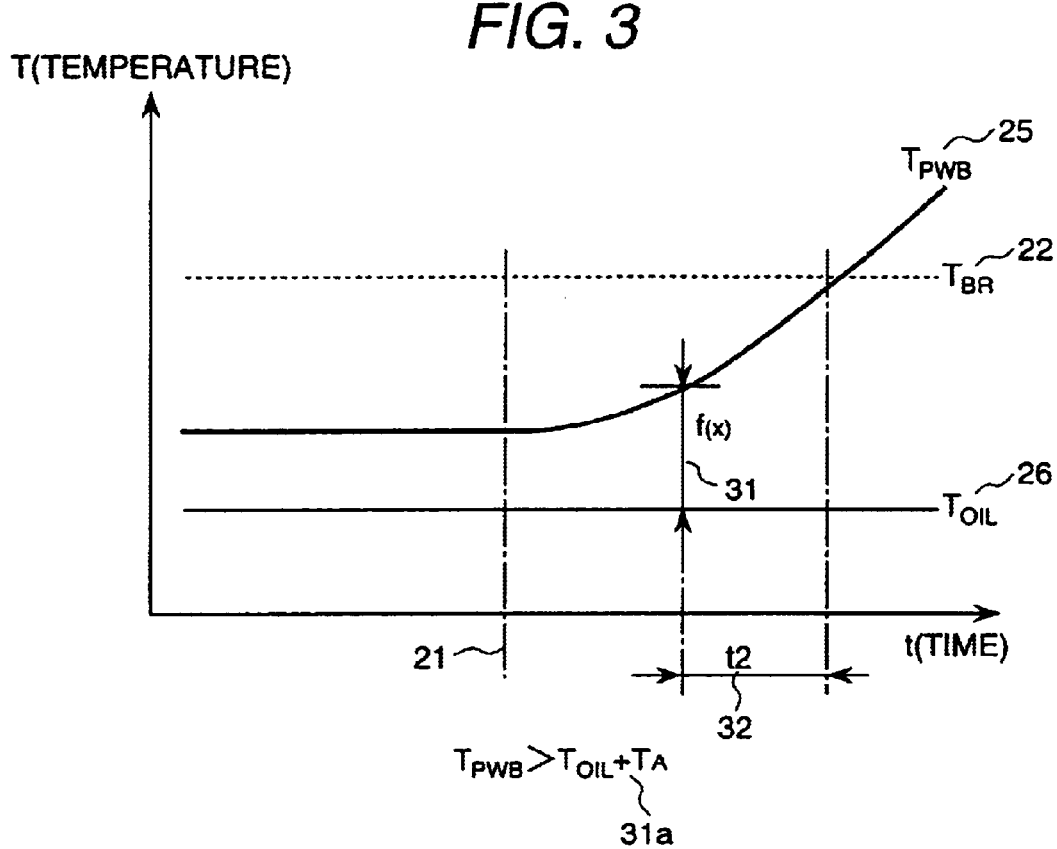
FIG. 3 is a graph showing another embodiment of the control apparatus.

FIG. 3 is a graph showing the relationship between the control apparatus internal temperature and external temperature, established by the occurrence of a control apparatus internal failure.

The factors in the figure denote the time 31 at which the relationship $$T_{PWB} > f(X) \tag{Expression 1}$$

$$f(X) = T_{OIL} + T_A \tag{Expression 2}$$

is satisfied when the required temperature is taken as $T_A$ (31a), and the time "t2" (32) from the above-mentioned time 31 to the arrival of control apparatus internal temperature $T_{PWB}$ 25 at $T_{BR}$, the temperature at which an internal element failure in the control apparatus is likely to occur.

Next, the flow of processes up to failure detection is described.

First, during normal operation of control apparatus 11, while the internal temperature $T_{PWB}$ 25 of the control apparatus and the external temperature $T_{OIL}$ 26 of the control apparatus are lower than failure detection temperature $T_{NG}$ 23 and the amount of heat occurring in the control apparatus is constant, internal temperature $T_{PWB}$ 25 and external temperature $T_{OIL}$ 26 always change with their difference remaining fixed. Next, if a specific element inside control apparatus 11 fails to operate in, for example, short-circuit mode, the internal temperature $T_{PWB}$ 25 of control apparatus will begin increasing at 21, the time when an internal element failure in the control apparatus is likely to occur. If internal temperature $T_{PWB}$ 25 continues increasing, the time 31 when the relationship between expressions 1 and 2 above is satisfied will be reached. At this time, CPU 12 will judge control apparatus 11 to be abnormal, and the CPU will start saving predetermined control data in internal memory medium 13. If internal temperature $T_{PWB}$ 25 further continues increasing, it will reach temperature $T_{BR}$ 25 at which the control apparatus is likely to encounter some other internal element failure, with the result that some other internal element of the control apparatus will fail.

The saving of the above-mentioned control data in internal memory medium 13 must be executed during the time "t2" (32) from the arrival of TPWB 25 at 31, the level at which the relationship between expressions 1 and 2 above is satisfied, to the arrival of $T_{PWB}$ 25 at temperature $T_{BR}$ 22, the temperature at which the control apparatus is likely to encounter some other internal element failure.

In the present invention, the starting time of saving of the required control data is defined as the time a fixed relationship is established between the external temperature $T_{OIL}$ 26 and internal temperature $T_{PWB}$ 25 of the control apparatus (this relationship is described in detail later in this document). When control apparatus 11 is in normal operation, since the relationship between control apparatus external temperature $T_{OIL}$ 26 and control apparatus internal temperature $T_{PWB}$ 25 is usually equivalent to the relationship of "Control apparatus internal temperature $T_{PWB}$ 25=Control apparatus external temperature $T_{OIL}$ 26+Temperature at which the control apparatus begins to generate heat internally", the relationship $$T_{PWB} > T_{OIL} \tag{Expression 3}$$

is always established. The required temperature $T_A$ (31a) mentioned above can therefore be defined by designing or measuring/confirming beforehand the internal heat-generating range existing during normal operation of control apparatus 11.

The saving of the above-mentioned control data in internal memory medium 13 must be executed during the time "t2" (32) from the arrival of $T_{PWB}$ 25 at 31, the level at which the relationship between expressions 1 and 2 above is satisfied, to the arrival of $T_{PWB}$ 25 at temperature $T_{BR}$ 22, the temperature at which the control apparatus is likely to encounter some other internal element failure. The starting timing of saving of the required control data in internal memory medium 13 is dictated by the parameters of control apparatus external temperature $T_{OIL}$ 26 and required temperature $T_A$ (31a), and for this reason, the required control data can be saved at the time of detection of the minimum temperature rise at which a control apparatus internal element failure is likely to occur. Even if the internal temperature of the control apparatus increases abruptly, therefore, the time required for control data saving in internal memory medium 13 can be increased above the saving time required in the case of the prior art. In addition, since the starting timing of saving of the required control data in internal memory medium 13 is dictated by the fixed relationship between control apparatus internal temperature $T_{PWB}$ 25 and required temperature $T_A$, this embodiment, unlike the prior art, does not create the problem that as a result of setting failure detection temperature $T_{NG}$ 23 to a smaller value in order to obtain a sufficient time for the required control data to be saved in internal memory medium 13, the ambient temperature range in which control apparatus 11 can operate properly becomes narrow.

Furthermore, although, in the case of the prior art, the distinction between a control apparatus internal failure and a control apparatus external failure is not is drawn during the judgment of whether the failure in control apparatus 11 is due to an increase in the internal temperature of the control apparatus or due to an increase in its external temperature, if an internal element failure detection flag is provided in, for example, CPU 12 and then a normal status and an abnormal status are defined as "0" and "1", respectively, when the relationship between expressions 1 and 2 is satisfied, "1" will be set up at the failure detection flag and the required control data will be saved in the internal memory medium 13 of control apparatus 11. After this, by conducting failure analyses based on the stored control data within the internal memory medium, the control apparatus failure can be judged to have been caused by an increase in the internal temperature of the control apparatus. Although, in this embodiment, the failure detection flag identifies a normal status as "0" and an abnormal status as "1", no problem will, of course, arise even if these settings of the flag are reversed.

Figure 10:
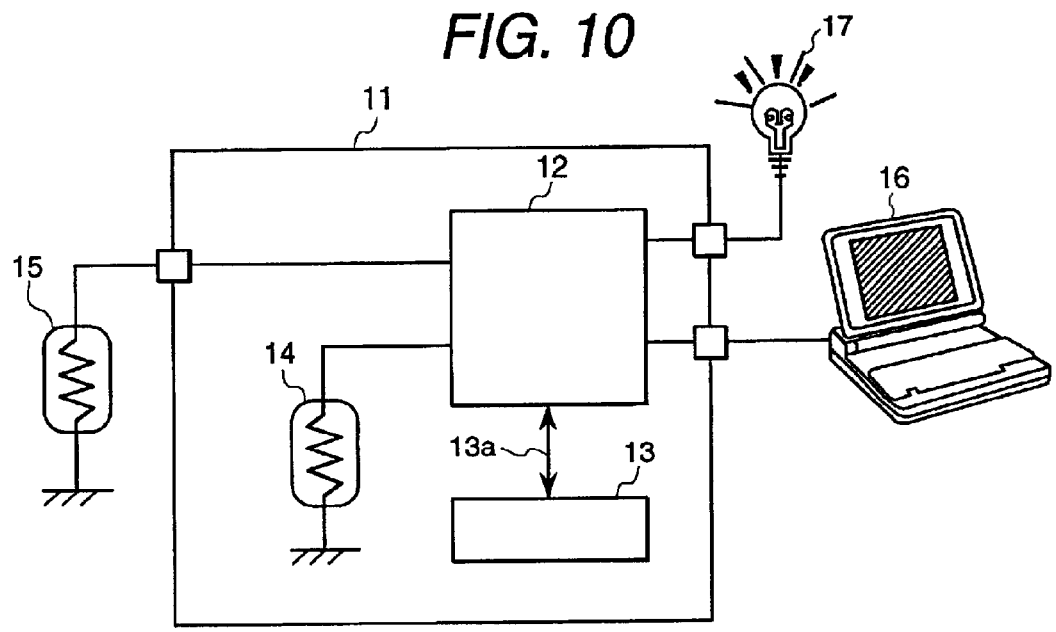
FIG. 10 shows an embodiment of the control apparatus.

In addition, in this embodiment, the following effect can be obtained by, as shown in FIG. 10, providing a warning lamp 17 that warns the user of a failure in the event of its detection by control apparatus 11:

When the relationship between expressions 1 and 2 is satisfied, the warning lamp, for example, will be activated or deactivated to inform to the user that a control apparatus failure has occurred. The user can then take the appropriate action (for example, turn off the power to control apparatus 11) according to the particular status of, for example, the above-mentioned warning unit 17. Although, in this embodiment, a warning lamp is used as warning unit 17, it is also possible, of course, to use a warning sound source such as an alarm buzzer, or to combine a warning lamp and a warning sound source.

Next, how a control apparatus internal failure due to unusual increases in the external temperature of the control apparatus is detected using the prior art, is described.

Figure 4:
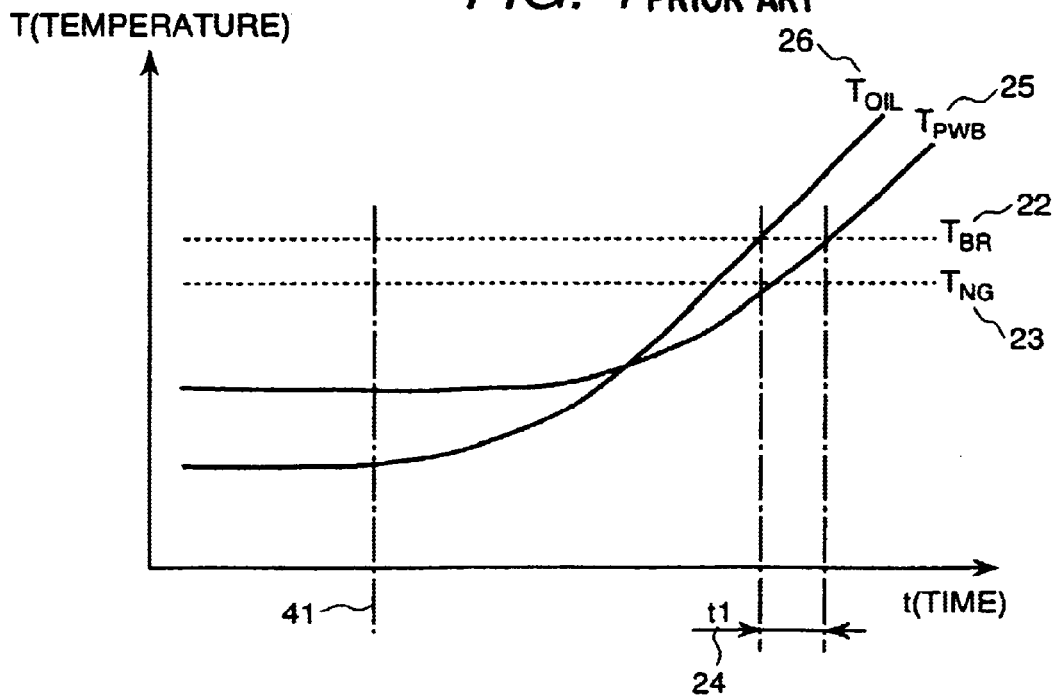
FIG. 4 is a graph showing yet another embodiment of the control apparatus.

FIG. 4 is a graph showing the relationship between the control apparatus internal temperature and external temperature, established by the occurrence of an unusual increase in the external temperature of control apparatus 11.

The factors in the figure denote the time 41 at which the external environment of the control apparatus is likely to become abnormal, and the time "t1" (21) from the arrival of the above-mentioned control apparatus internal temperature $T_{PWB}$ 25 at the above-mentioned failure detection temperature $T_{NG}$ 23 to the arrival of $T_{PWB}$ 25 at $T_{BR}$ 22, the temperature at which an internal element failure in the control apparatus is likely to occur.

Next, the flow of processes up to failure detection is described.

First, during normal operation of control apparatus 11, while the internal temperature $T_{PWB}$ 25 of the control apparatus and the external temperature $T_{OIL}$ 26 of the control apparatus are lower than failure detection temperature $T_{NG}$ 23 and temperature $T_{BR}$ 22 at which an internal element failure in the control apparatus is likely to occur, and while the amount of heat occurring in the control apparatus is constant, internal temperature $T_{PWB}$ 25 and external temperature $T_{OIL}$ 26 always change with their difference remaining fixed (see the left of the dotted line shown as 41 in FIG. 4). Next, if the external environment of control apparatus 11 becomes abnormal, for example, if the cooling unit in a system fails to operate, the internal temperature $T_{PWB}$ 25 of the control apparatus will begin increasing at 41, the time at which the external environment of the control apparatus is likely to enter an abnormal region. If external temperature $T_{OIL}$ 26 continues increasing under that state, the internal temperature $T_{PWB}$ 25 of the control apparatus will also continue increasing. If external temperature $T_{OIL}$ 26 further continues increasing, the internal temperature $T_{PWB}$ 25 of the control apparatus will also further continue increasing and reach the failure detection temperature $T_{NG}$ 23 of control apparatus 11. At this time, CPU 12 will judge control apparatus 11 to be abnormal, and the CPU will start saving predetermined control data in internal memory medium 13.

As described in the embodiment of FIG. 2, if the temperature gradient of control apparatus external temperature $T_{OIL}$ 26 is too steep, since the temperature gradient of control apparatus internal temperature $T_{PWB}$ 25 will also be too steep, it may not be possible to obtain a sufficient time for the control data to be saved in internal memory medium 13. There also occurs the problem that since failure detection temperature $T_{NG}$ 23 must be set to a smaller value to obtain a sufficient time for the control data to be saved in internal memory medium 13, it becomes absolutely necessary to make narrower the ambient temperature range in which control apparatus 11 can operate properly. In addition, the prior art creates the problem that because of the absence of the concept that the judgment of whether the failure in control apparatus 11 is due to an increase in the internal temperature of the control apparatus or due to an increase in its external temperature is not based on such distinction, the above judgment cannot be performed even by conducting failure analyses based on the control data that was stored into the internal memory medium 13 of the control apparatus.

Next, the detection of control apparatus external temperature increases, based on the present invention, is described.

Figure 5:
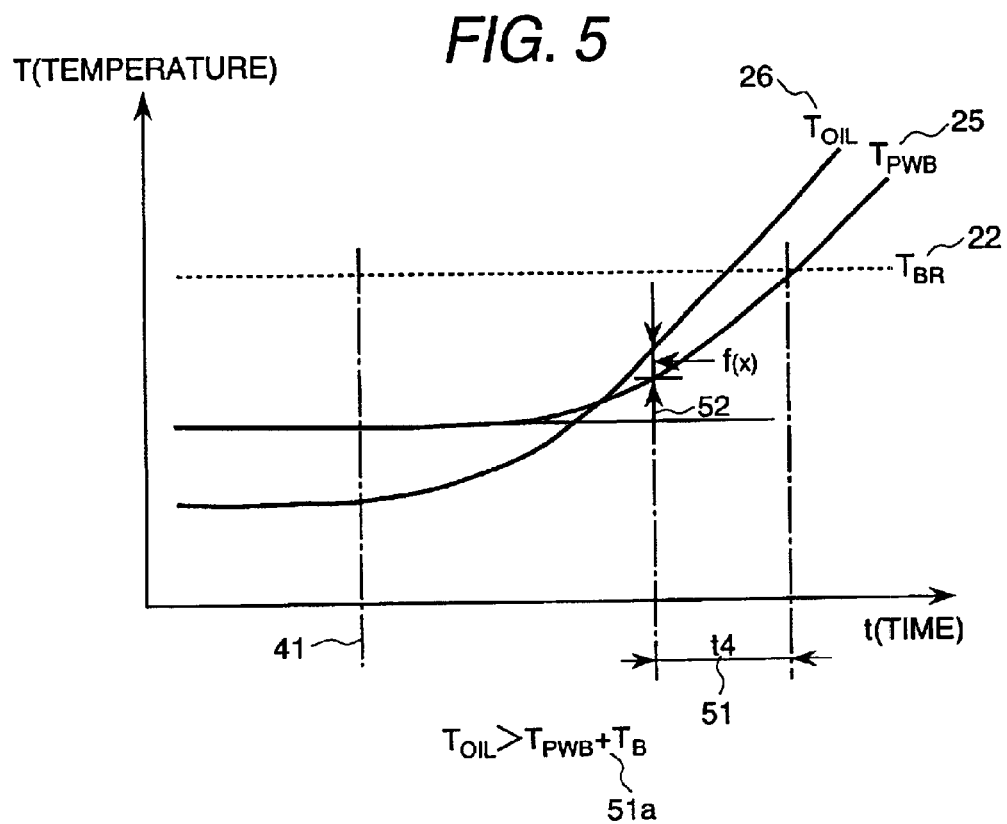
FIG. 5 is a graph showing a further embodiment of the control apparatus.

FIG. 5 is a graph showing the relationship between the control apparatus internal temperature and external temperature, established by unusual increases in the internal temperature of control apparatus 11.

The factors in the figure denote the time 52 at which the relationship $$T_{OIL} > f(X) \quad \text{(Expression 4)}$$

$$f(X) = T_{PWB} + T_B \quad \text{(Expression 5)}$$

is satisfied when the external temperature of the control apparatus is taken as $T_B$ (51a), and the time "t4" (51) from the above-mentioned time 52 to the arrival of control apparatus internal temperature $T_{PWB}$ 25 at $T_{BR}$, the temperature at which an internal element failure in the control apparatus is likely to occur.

Next, the flow of processes up to failure detection is described.

First, during normal operation of control apparatus 11, while the internal temperature $T_{PWB}$ 25 of the control apparatus and the external temperature $T_{OIL}$ 26 of the control apparatus are lower than failure detection temperature $T_{NG}$ 23 and temperature $T_{BR}$ 22 at which an internal element failure in the control apparatus is likely to occur, and while the amount of heat occurring in the control apparatus is constant, internal temperature $T_{PWB}$ 25 and external temperature $T_{OIL}$ 26 always change with their difference remaining fixed. Next, if the external environment of control apparatus 11 becomes abnormal, for example, if the cooling unit in a system fails to operate, the external temperature $T_{OIL}$ 26 of the control apparatus will begin increasing at 41, the time at which the external environment of the control apparatus is likely to enter an abnormal region.

If the internal temperature $T_{PWB}$ 25 of the control apparatus continues increasing, the time 52 when the relationship between expressions 4 and 5 above is satisfied will be reached. At this time, CPU 12 will judge control apparatus 11 to be abnormal, and the CPU will start saving predetermined control data in internal memory medium 13. If internal temperature $T_{PWB}$ 25 further continues increasing, it will reach temperature $T_{BR}$ 25 at which the control apparatus is likely to encounter some other internal element failure, with the result that some other internal element of the control apparatus will fail.

The saving of the above-mentioned control data in internal memory medium 13 must be executed during the time 52 from the arrival of TPWB 25 at 41, the level at which the relationship between expressions 4 and 5 above is satisfied, to the arrival of TPWB 25 at temperature TBR 22, the temperature at which the control apparatus is likely to encounter some other internal element failure.

In this embodiment, the starting time of saving of the required control data is defined as the time a fixed relationship is established between the external temperature $T_{OIL}$ 26 and internal temperature $T_{PWB}$ 25 of the control apparatus (this relationship is described in detail later in this document). When control apparatus 11 is in normal operation, since the relationship between control apparatus external temperature $T_{OIL}$ 26 and control apparatus internal temperature $T_{PWB}$ 25 is usually equivalent to the relationship of "Control apparatus internal temperature $T_{PWB}$ 25=Control apparatus external temperature $T_{OIL}$ 26+Temperature at which the control apparatus begins to generate heat internally", the relationship $$T_{OIL} > T_{PWB} \quad \text{(Expression 6)}$$

is always established. The relationship of expression 6 above will also hold if the external temperature of control apparatus 11 unusually increases. However, since it is necessary to allow for temperature changes in the external environment of control apparatus 11, the required temperature $T_B$ (51a) mentioned above can be defined by designing or measuring/confirming beforehand the range of temperature changes in the external environment of the control apparatus existing during normal operation thereof.

The saving of the above-mentioned control data in internal memory medium 13 must be executed during the time "t4" (51) from the arrival of $T_{PWB}$ 25 at 52, the level at which the relationship between expressions 4 and 5 above is satisfied, to the arrival of $T_{PWB}$ 25 at temperature $T_{BR}$ 22, the temperature at which the control apparatus is likely to encounter some other internal element failure.

The starting timing of saving of the required control data in internal memory medium 13 is dictated by the parameters of control apparatus external temperature $T_{OIL}$ 26 and required temperature $T_A$ (31a), and for this reason, the required control data can be saved at the time of detection of the minimum temperature rise at which the external temperature of control apparatus 11 is likely to start unusually increasing. Even if the external temperature of the control apparatus increases abruptly, therefore, the time required for control data saving in internal memory medium 13 can be increased above the saving time required in the case of the prior art. In addition, since the starting timing of saving of the required control data in internal memory medium 13 is dictated by the fixed relationship between control apparatus internal temperature $T_{PWB}$ 25 and required temperature $T_B$, this embodiment, unlike the prior art, does not create the problem that as a result of setting failure detection temperature $T_{NG}$ 23 to a smaller value in order to obtain a sufficient time for the required control data to be saved in internal memory medium 13, the ambient temperature range in which control apparatus 11 can operate properly becomes narrow. Furthermore, although, in the case of the prior art, the distinction between a control apparatus failure due to increases in the internal temperature of control apparatus 11 and a control apparatus failure due to increases in the external temperature of control apparatus 11 is not is drawn during the analysis of control apparatus failures, if an external environment abnormality detection flag is provided in, for example, CPU 12 and then a normal status and an abnormal status are defined as "0" and "1", respectively, when the relationship between expressions 4 and 5 is satisfied, "1" will be set up at the failure detection flag and the required control data will be saved in the internal memory medium 13 of control apparatus 11. After this, by conducting failure analyses based on the stored control data within the internal memory medium, the control apparatus failure can be judged to have been caused by an increase in the external temperature of the control apparatus. Although, in this embodiment, the abovementioned detection flag identifies a normal status as "0" and an abnormal status as "1", no problem will, of course, arise even if these settings of the flag are reversed.

In addition, in this embodiment, the following effect can be obtained by, as shown in FIG. 10, providing a warning lamp 17 that warns the user of a failure in the event of its detection by control apparatus 11:

When the relationship between expressions 4 and 5 is satisfied, the warning lamp, for example, will be activated or deactivated to inform to the user that a control apparatus failure has occurred. The user can then take the appropriate action (for example, turn off the power to control apparatus 11) according to the particular status of the above-mentioned warning unit 17. Although, in this embodiment, a warning lamp is used as warning unit 17, it is also possible, of course, to use a warning sound source such as an alarm buzzer, or to combine a warning lamp and a warning sound source.

Figure 9:
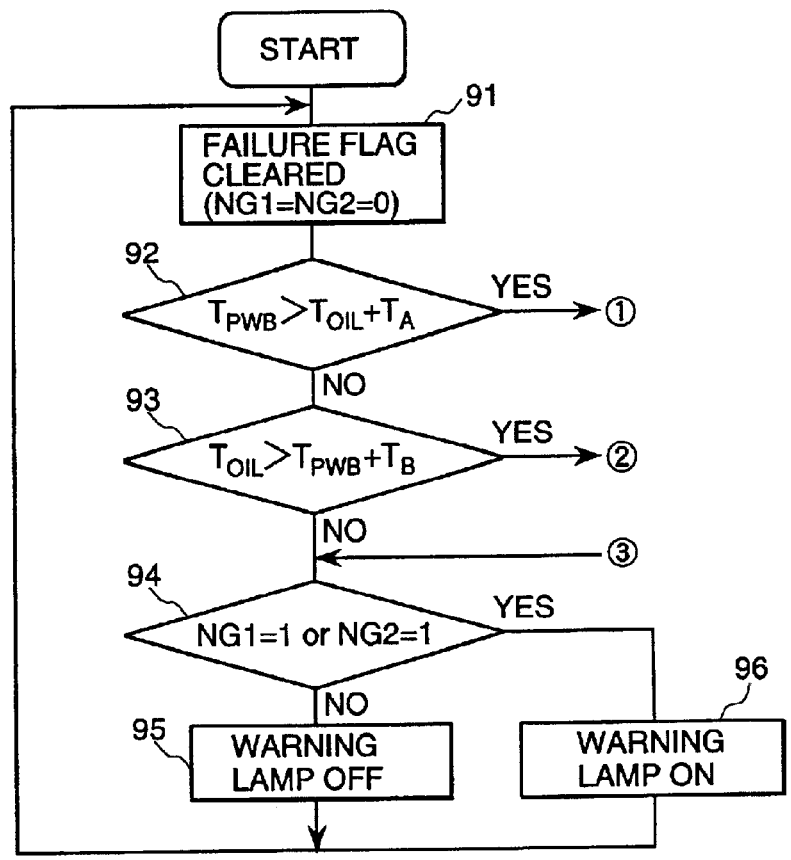
FIG. 9 is a flowchart showing an embodiment of the control apparatus.
Figure 9:
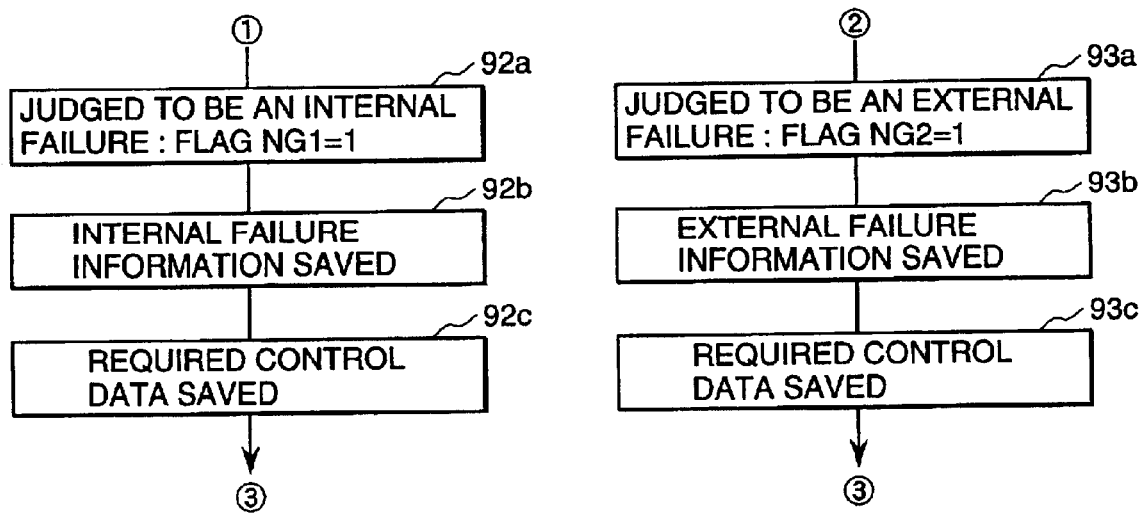

Next, the preferred embodiments of the present invention are described using the flowchart of FIG. 9.

This flowchart consists of a block 91 for initializing the internal failure flag and the external failure flag to "0", a branching block 92 for detecting internal failures in the control apparatus, a branching block 93 for detecting control apparatus external failures, a branching block 93 for judging whether the failure flag is set up, a block 95 for deactivating the warning lamp, a block 96 for activating the warning lamp, a block 92a for detecting a control apparatus internal failure and setting the NG1 internal failure flag to "1", a block 92b for saving internal failure information, a block 92c for saving the required control data, a block 93a for detecting a control apparatus external failure and setting the NG external failure flag to "1", a block 93b for saving external failure information, and a block 93c for saving the required control data.

First, control during normal operation of control apparatus 11 is described.

When the control begins, the NG1 and NG2 failure flags are initialized to "0" by block 91. The control then moves to the branching block 92 for judging whether any temperature increases implying an internal failure are occurring in control apparatus 11, and in this block, whether the conditions of expressions 1 and 2 are satisfied is judged. When these conditions are satisfied, it is judged that an internal failure is occurring in control apparatus 11, and then the control moves to subroutine ①. In this example, since it is assumed that control apparatus 11 is normal and thus that the conditions are not satisfied, the control moves to branching block 93, in which the conditions of expressions 4 and 5 are satisfied is judged. When the conditions are satisfied, it is judged that an external failure is occurring in control apparatus 11, and then the control moves to subroutine ②. In this example, since it is assumed that control apparatus 11 is normal and thus that the conditions are not satisfied, the control moves to branching block 94, in which the states of the NG1 and NG2 failure flags are confirmed, then if either is "1" or both are "1", the control apparatus is judged to be abnormal, and the control moves to the block 96 that activates the warning lamp. In this example, since it is assumed that control apparatus 11 is normal and thus that the above conditions are not satisfied, the control moves to branching block 95. In block 95, the warning lamp is deactivated and the control returns to the first step.

Next, the control assuming that an internal failure has occurred in control apparatus 11 is described.

When the control begins, the NG1 and NG2 failure flags are initialized to "0" by block 91. The control then moves to the branching block 92 for judging whether any temperature increases implying an internal failure are occurring in control apparatus 11, and in this block, whether the conditions of expressions 1 and 2 are satisfied is judged. When these conditions are satisfied, it is judged that an internal failure is occurring in control apparatus 11, and then the control moves to subroutine ①. In this example, since it is assumed that an internal failure has occurred in control apparatus 11 and thus that the conditions are satisfied, the control moves to subroutine ①. In block 92a, the control apparatus internal failure is detected and internal failure flag NG1 is set to "1". Next, the process for saving internal failure information is performed in block 92b. After this, the process for saving the required control data which has been predetermined is performed in block 92c. The control moves to subroutine ③ and then moves on to branching block 94. In this block, the states of the NG1 and NG2 failure flags are confirmed. In this example, since the state of internal failure flag NG1 is "1", the control moves to block 96. In this block, the warning lamp is activated to inform the user of the abnormality, and the control returns to the first step.

Next, the control assuming that an external failure has occurred in control apparatus 11 is described.

When the control begins, the NG1 and NG2 failure flags are initialized to "0" by block 91. The control then moves to the branching block 92 for judging whether any temperature increases implying an internal failure are occurring in control apparatus 11, and in this block, whether the conditions of expressions 1 and 2 are satisfied is judged. When these conditions are satisfied, it is judged that an internal failure is occurring in control apparatus 11, and then the control moves to subroutine ①. In this example, however, since it is assumed that an external failure has occurred in control apparatus 11 and thus that the conditions are not satisfied, the control moves to branching block 93. In block 93, whether the conditions of expressions 4 and 5 are satisfied is judged. When the conditions are satisfied, it is judged that an external failure is occurring in control apparatus 11, and then the control moves to subroutine ②. In this example, since it is assumed that a control apparatus external failure has occurred and thus that the above conditions are satisfied, the control moves to subroutine ②. In block 93a, the control apparatus is judged to have encountered an external failure, and external failure flag NG2 is set to "1". Next, the process for saving external failure information is performed in block 93b.

After this, the process for saving the required control data which has been predetermined is performed in block 93c. The control moves to subroutine ③ and then moves on to branching block 94. In this block, the states of the NG1 and NG2 failure flags are confirmed. Since the state of external failure flag NG2 in this example is "1", the control moves to block 96. In this block, the warning lamp is activated to inform the user of the abnormality, and the control returns to the first step.

In the routine described above, failure information on control apparatus 11 is saved in internal memory medium 13. Therefore, for example, when failure analyses are performed on control apparatus 11, it can be readily judged, by reading out data from the internal memory medium 13 of the control apparatus, whether the failure in the control apparatus was caused by the abnormality of the ambient temperature or of some internal element of the control apparatus itself.

Although, in the above example shown as an embodiment, the warning lamp is activated to inform to the user that the control apparatus has become abnormal, a warning sound source or a combination of a warning lamp and a warning sound source can, of course, be used instead of the warning lamp. Or it is possible to save the required control data without giving a warning to the user.

Next, a method of specifying the required temperatures $T_A$ (31a) and $T_B$ (51b) mentioned above is described. Resin or a metal is usually used as the casing material of control apparatus 11.

Control apparatus 11 is characterized in that it is constructed so that whether the failure is due to the internal factors of the control apparatus or due to the internal factors thereof can be easily identified. The failure detection conditions can be further optimized by setting the required temperatures $T_A$ (31a) and $T_B$ (51b) in expressions 1, 2, 4, and 5, to the values that depend on heat resistance, the physical characteristics value of the casing of control apparatus 11.

Next, another embodiment of the present invention is described below using FIG. 6.

Control apparatus 11 in this embodiment comprises an interface circuit 61 for reading out information from an internal memory medium, a power supply line 62a for the internal memory medium, a GND supply line 62b for the internal memory medium, and an external power supply 62.

An embodiment of control apparatus 11 is described below.

In this embodiment, by connecting a monitoring unit 16 to the above-mentioned interface circuit 61 for reading out information from an internal memory medium and connecting external power supply 62 to the power supply line 62a and GND supply line 62b routed from the internal memory medium, the required data that has been stored into internal memory medium 13 can be read out, without interference from the other circuits of control apparatus 11.

That is to say, as described above, if a control apparatus failure caused by the abnormality of the ambient temperature or of some internal element of the control apparatus itself occurs and the failure extends to CPU 12, when the required data within internal memory medium 13 is to be later read out, it may not be possible to analyze the cause of the failure, since the data readout operation itself may be impossible. However, by providing an interface circuit 61 for internal memory medium information readout, an internal memory medium 13, a power supply line 62a for the internal memory medium, and a GND supply line 62b for the internal memory medium, and connecting a monitoring unit 16 to the above-mentioned interface circuit 61 for internal memory medium information readout, it becomes possible to read out the required data from internal memory medium 13 independently, in other words, directly, without the intervention of CPU 12, even if the CPU fails.

Next, another embodiment of the present invention is described below using FIG. 7.

Numeral 71a in this embodiment denotes a temperature fuse that will blow out when the required temperature is reached.

Figure 6:
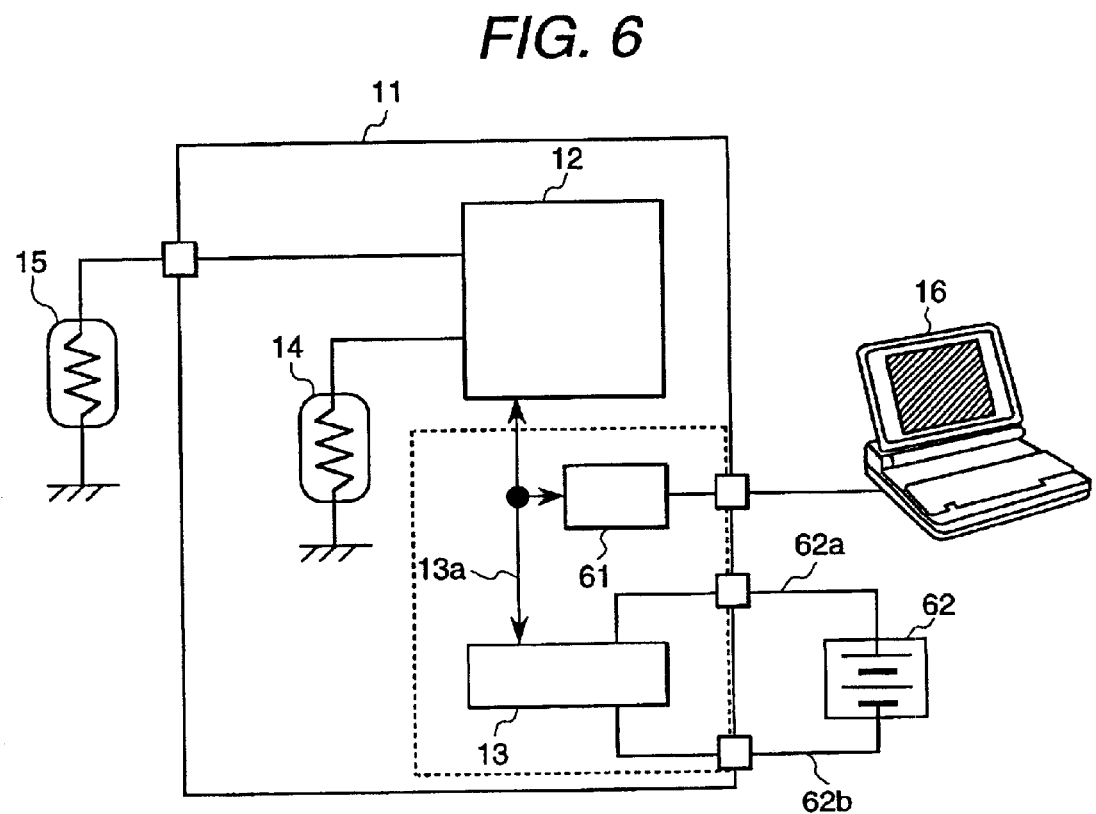
FIG. 6 is a block diagram showing another embodiment of the control apparatus.

It was described in the embodiment of FIG. 6 that even if CPU 12 fails, the required data can be read out from internal memory medium 13. In the embodiment of FIG. 7, however, since the above-mentioned temperature fuse 71a is connected to a signal line 13a present between CPU 12 and internal memory medium 13, when the required temperature load is applied to control apparatus 11, temperature fuse 71a blows out and internal memory medium information readout interface circuit 61 and internal memory medium 13 can be made independent. Consequently, even if a control apparatus failure due to the abnormality of the ambient temperature or of the elements of the control apparatus itself occurs and the terminals of CPU 12 connected to internal memory medium 13 malfunction in GND short-circuit mode or power supply short-circuit mode, since temperature fuse 71a blows out to open the corresponding circuit, the connection of a monitoring unit 16 to the abovementioned interface circuit 61 provided for reading out information from an internal memory medium and the connection of an external power supply 62 to the power supply line 62a and GND supply line 62b routed from the internal memory medium enable the required data to be read out from internal memory medium 13 without interference from the other circuits of control apparatus 11.

That is to say, as described above, if a control apparatus failure caused by the abnormality of the ambient temperature or of some internal element of the control apparatus itself occurs and the failure extends to CPU 12, when the required data within internal memory medium 13 is to be later read out, it may not be possible to analyze the cause of the failure, since the data readout operation itself may be impossible. However, by providing an interface circuit 61 for internal memory medium information readout, an internal memory medium 13, a power supply line 62a for the internal memory medium, a GND supply line 62b for the internal memory medium, and a temperature fuse 71a that blows out at the required temperature, and connecting a monitoring unit 16 to the above-mentioned interface circuit 61 for internal memory medium information readout, it becomes possible to read out the required data from internal memory medium 13 independently without the intervention of CPU 12, even if the CPU fails.

Next, yet another embodiment of the present invention is described below using FIG. 11.

An OPEN circuit 71b that can open/close the required circuit under the command sent from CPU 12 is provided in this embodiment.

Yet another embodiment of the present invention is described below.

Figure 7:
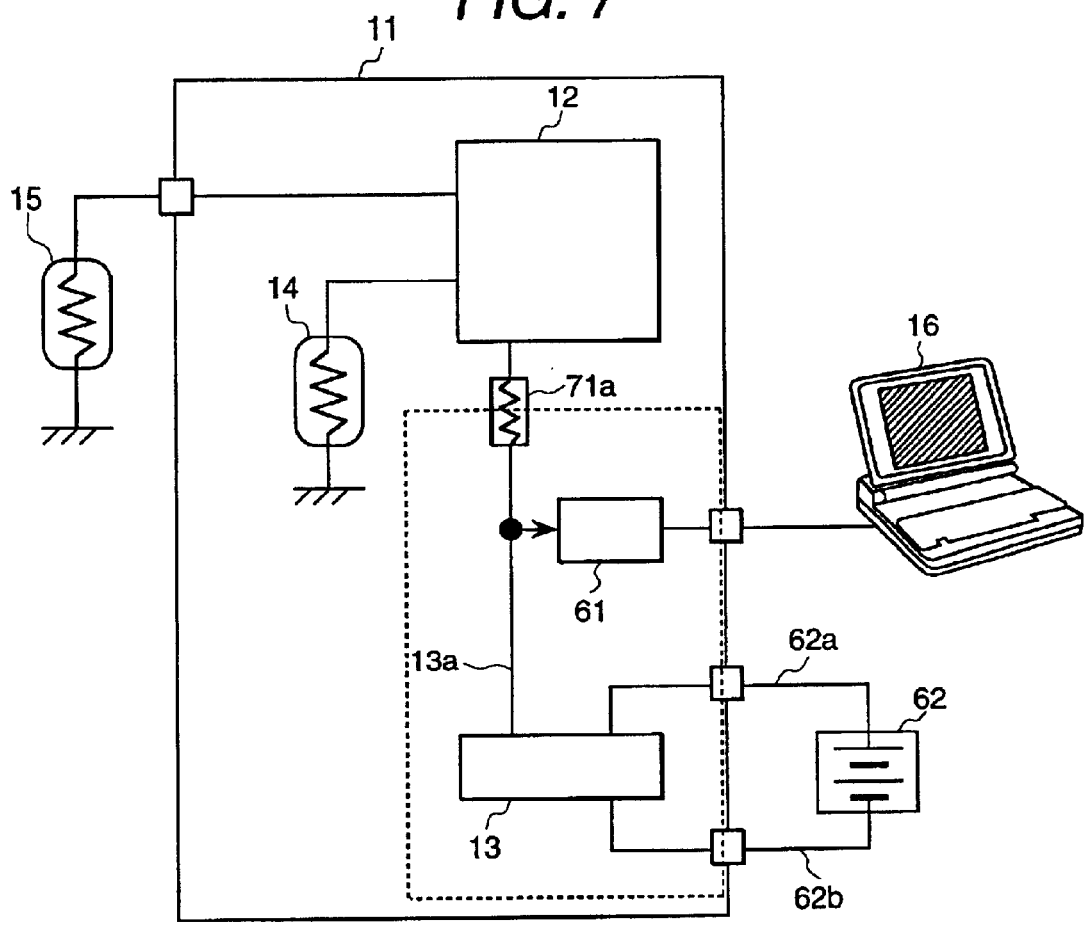
FIG. 7 is a block diagram showing yet another embodiment of the control apparatus.

This embodiment is characterized in that it has an OPEN circuit 71b by which the required circuit can be opened/closed under the command of CPU 12 when the required temperature load is applied to the control apparatus 11 used in the embodiment of FIG. 7.

Figure 11:
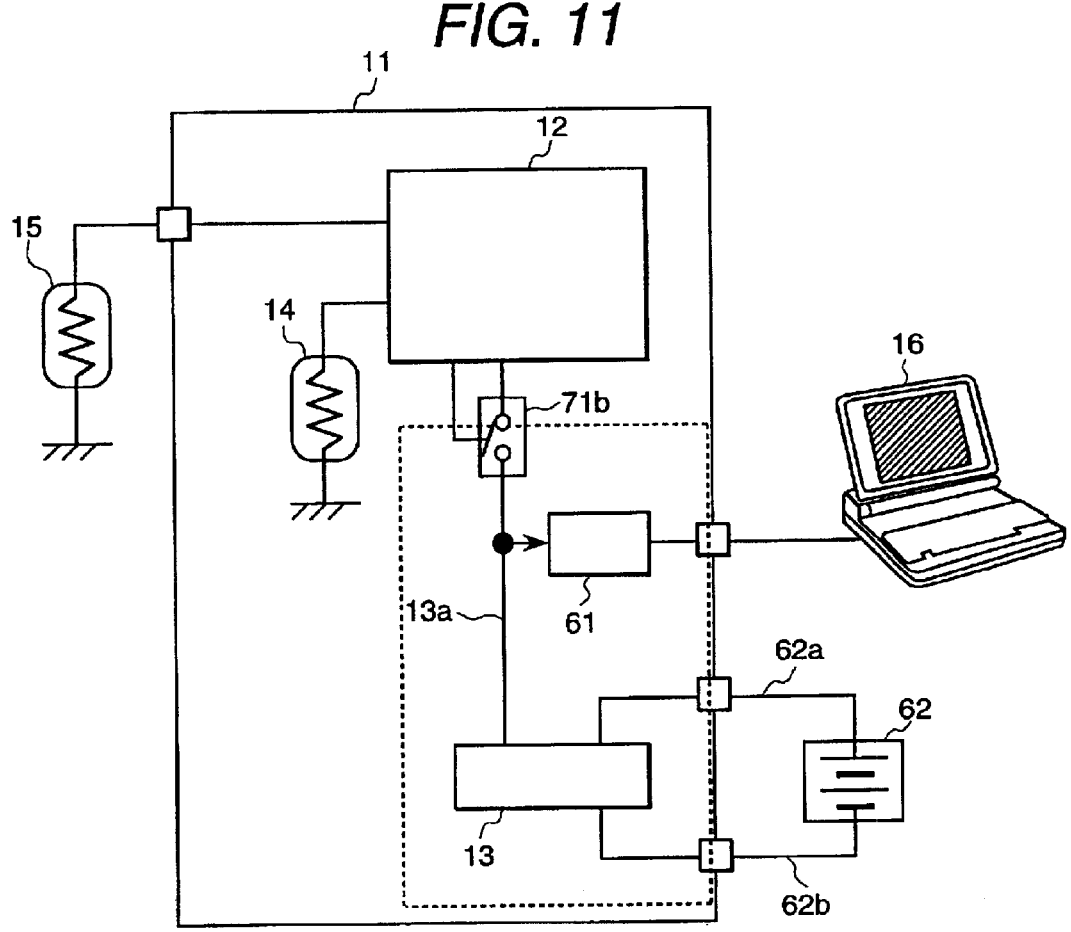
FIG. 11 shows another embodiment of the control apparatus.

It is needless to say that effects equivalent to those of the embodiment of FIG. 7 can also be obtained in the embodiment of FIG. 11.

Figure 8:
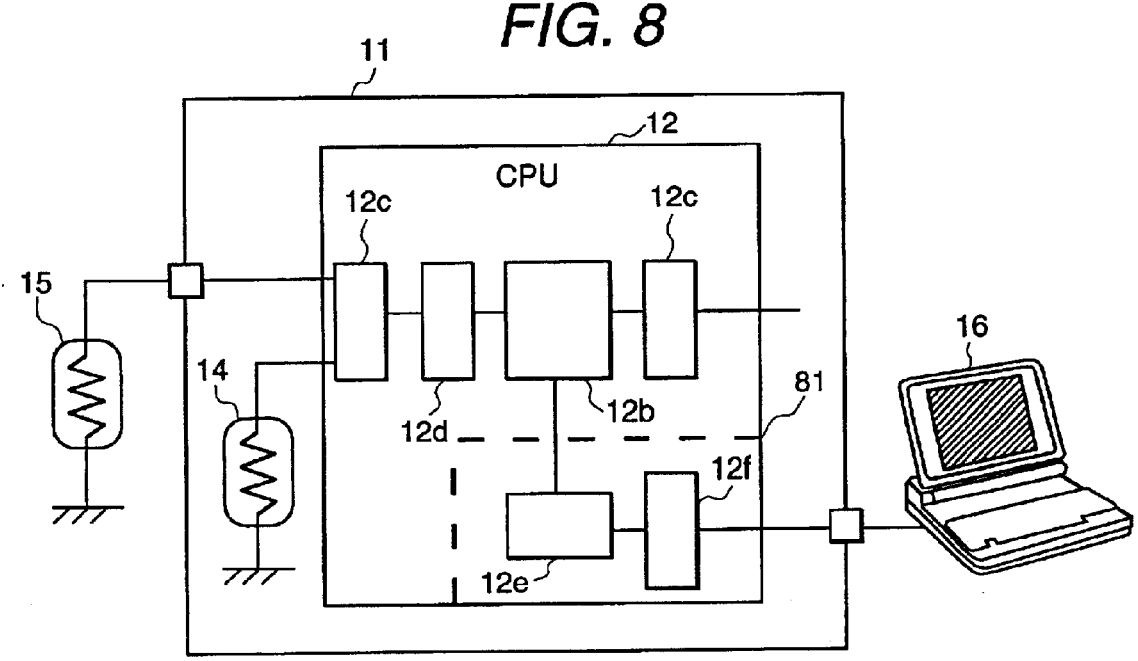
FIG. 8 is a block diagram showing a further embodiment of the control apparatus.

Next, yet another embodiment of the present invention is described below using FIG. 8.

Numeral "12c" in this embodiment denotes an input/output interface circuit provided inside CPU 12. Similarly, numerals "12b", "12e", "12f", and "81" denote a chip core, a CPU internal memory medium, an interface circuit for reading out information from the CPU internal memory medium, and an isolation layer that was created by separating the inside of CPU 12 into the required area.

This embodiment is characterized in that CPU internal memory medium "12e" for saving the required data, and interface circuit "12f" for reading out information from the CPU internal memory medium are arranged inside CPU 12 and in that the inside of CPU 12 is separated from the required control chip core "12b", the required input/output interface circuit "12c", an A/D conversion circuit "12d", and other circuits, by means of isolation layer 81.

According to this embodiment, even if a control apparatus failure caused by the abnormality of the ambient temperature or of some internal element of the control apparatus itself occurs and CPU 12 partly malfunctions as a result, the required data that has been stored into internal memory medium "13e" can be read out by connecting a monitoring unit 16 to the above-mentioned interface circuit "12f" for reading out information from the internal memory medium.

Even if the temperature gradient existing under the abnormal status of the control apparatus is too steep, the necessary and sufficient information can be saved in the memory media of the control apparatus. It is also possible to conduct failure analyses for judging whether the control apparatus failure was caused by the abnormality of the ambient temperature or of some internal element of the control apparatus itself.

What is claimed is:

1. A control apparatus comprising:
   a first sensor for detecting the internal temperature of the control apparatus,
   a second sensor for detecting the external temperature of the control apparatus, and
   internal memory media for storing information that has been created inside the control apparatus,
   wherein when the difference between the temperature information obtained from said first sensor and the temperature information obtained from said second sensor is maintained in a required relationship, modifications performed on the information stored in said internal memory media depend on whether the temperature difference indicates a control apparatus failure due to a failure in an apparatus external to the control apparatus or a control apparatus failure due to a control apparatus internal failure.

2. A control apparatus as set forth in claim 1, wherein when the internal temperature of the control apparatus and the external temperature of the control apparatus satisfy the relationship of "Control apparatus internal temperature>Control apparatus external temperature+ Required temperature", this state is considered to be a control apparatus internal failure.

3. A control apparatus as set forth in claim 2, wherein the required temperature, a judgment parameter relating to control apparatus internal failures, is defined as a value dependent on a thermal resistance of a casing material used for the control apparatus.

4. A control apparatus as set forth in claim 3, wherein there is provided a unit for warning the user of the control apparatus failure self-detected by the control apparatus.

5. A control apparatus as set forth in claim 2, wherein there is provided a unit for warning the user of the control apparatus failure self-detected by the control apparatus.

6. A control apparatus as set forth in claim 1, wherein when the internal temperature of the control apparatus and the external temperature of the control apparatus satisfies the relationship of "Control apparatus external temperature>Control apparatus internal temperature+ Required temperature", a failure is considered to be occurring in an apparatus external to the control apparatus.

7. A control apparatus as set forth in claim 6, wherein the required temperature, a judgment parameter relating to control apparatus external failures, is defined as a value dependent on a thermal resistance of a casing material used for the control apparatus.

8. A control apparatus as set forth in claim 6, wherein there is provided a unit for warning the user of the control apparatus failure self-detected by the control apparatus.

9. A control apparatus as set forth in claim 1, wherein the control apparatus is configured so as to enable direct reading of the required information that has been recorded on the internal memory media.

10. A control apparatus as set forth in claim 1, wherein there is provided an element that fuses when the internal temperature of the control apparatus exceeds the required temperature, and the control apparatus is also configured so that when the internal temperature of the control apparatus exceeds the required temperature, the resulting fusion of said element provided in at least one of the internal memory media, an external readout circuit, and a power supply circuit enables direct reading of the required information recorded on the internal memory media.

11. A control apparatus as set forth in claim 1, wherein the internal memory media for storing failure cause information are contained in a CPU, and the control apparatus itself is configured so that even if a CPU failure occurs, the required information recorded on the internal memory media can be directly read.

12. A control apparatus as set forth in claim 1, wherein there is provided a circuit that will open the required circuit when the internal temperature of the control apparatus exceeds the required temperature, and the control apparatus is also configured so that when the internal temperature of the control apparatus exceeds the required temperature, said circuit provided in at least one of the internal memory media, an external readout circuit, and a power supply circuit opens and thus enables the required information within the internal memory media to be read independently without a CPU intervening.

13. A control apparatus as set forth in claim 1, wherein there is provided a unit for warning the user of the control apparatus failure self-detected by the control apparatus.

14. A control apparatus failure diagnosis method comprising:

detecting the external temperature of a control apparatus, detecting the internal temperature of the control apparatus, calculating the difference between the internal and external temperatures of the control apparatus using a device for calculating temperature difference based on said detection results, storing information indicative of a control apparatus internal failure or a failure in an apparatus external to the control apparatus based on a relationship between said internal-external temperature difference and a required temperature into a memory device, and transmitting said information from the control apparatus to an apparatus external thereto.

15. A failure diagnosis method as set forth in claim 14, wherein power is supplied said to said memory device in which the information based on said relationship has been stored, and the stored information based on said relationship is fetched from said memory device without the intervention of said device for calculating the temperature difference.

16. A failure diagnosis method as set forth in claim 15, wherein the required temperature is a value based on a heat resistance of a casing of said control apparatus.

17. A failure diagnosis method as set forth in claim 15, wherein said relationship satisfies "Said internal temperature>Said external temperature+First required temperature" or "Said external temperature>Said internal temperature+Second required temperature".

18. A failure diagnosis method as set forth in claim 14, wherein the required temperature is a value based on a heat resistance of a casing of said control apparatus.

19. A failure diagnosis method as set forth in claim 18, wherein said relationship satisfies "Said internal temperature>Said external temperature+First required temperature" or "Said external temperature>Said internal temperature+Second required temperature".

20. A failure diagnosis method as set forth in claim 14, wherein said relationship satisfies "Said internal temperature>Said external temperature+First required temperature" or "Said external temperature>Said internal temperature+Second required temperature".

* * * * *